United States Patent [19]

Warinner

[11] Patent Number: 5,779,007
[45] Date of Patent: Jul. 14, 1998

[54] SHOCK ABSORBER WITH HYDRAULIC FLUID CONTROL ROD

[75] Inventor: Derek K. Warinner, Lafayette, Ind.

[73] Assignee: TRW Inc., Lyndhurst, Ohio

[21] Appl. No.: 681,173

[22] Filed: Jul. 22, 1996

[51] Int. Cl.$^6$ .................................................. F16F 9/48
[52] U.S. Cl. .................................. 188/289; 188/317
[58] Field of Search .................... 188/284, 289, 188/322.15, 322.13, 316, 317

[56] References Cited

U.S. PATENT DOCUMENTS

| | | |
|---|---|---|
| 2,992,836 | 7/1961 | Vogel . |
| 3,033,384 | 5/1962 | Zanow et al. .............. 188/289 X |
| 3,111,201 | 11/1963 | Bliven et al. .............. 188/289 |
| 3,152,667 | 10/1964 | Powell .............. 188/289 |
| 3,229,971 | 1/1966 | Stretch et al. .............. 188/289 X |
| 3,367,453 | 2/1968 | Arendarski .............. 188/289 |
| 3,677,561 | 7/1972 | McNally . |
| 3,790,146 | 2/1974 | Hoffmann et al. . |
| 3,945,626 | 3/1976 | Tilkens . |
| 4,226,408 | 10/1980 | Tomita et al. . |
| 4,405,119 | 9/1983 | Masclet et al. .............. 188/289 X |
| 4,741,516 | 5/1988 | Davis . |
| 4,750,756 | 6/1988 | Voorhies . |
| 5,152,547 | 10/1992 | Davis . |
| 5,429,384 | 7/1995 | Takahashi et al. . |

*Primary Examiner*—Lee W. Young
*Attorney, Agent, or Firm*—Tarolli, Sundheim, Covell, Tummino & Szabo

[57] ABSTRACT

A shock absorber (10) is longitudinally compressible and extendable under the influence of vehicle suspension loads. The shock absorber (10) includes a tubular structure (16) which defines upper and lower hydraulic fluid chambers (52, 50) above and below a piston (18). A control rod (28) is supported for movement longitudinally through the piston (18) simultaneously with compression and extension of the shock absorber (10). The control rod (28) and the piston (18) together define a hydraulic fluid flow path extending through the piston (18) between the upper and lower fluid chambers (52, 50).

5 Claims, 4 Drawing Sheets

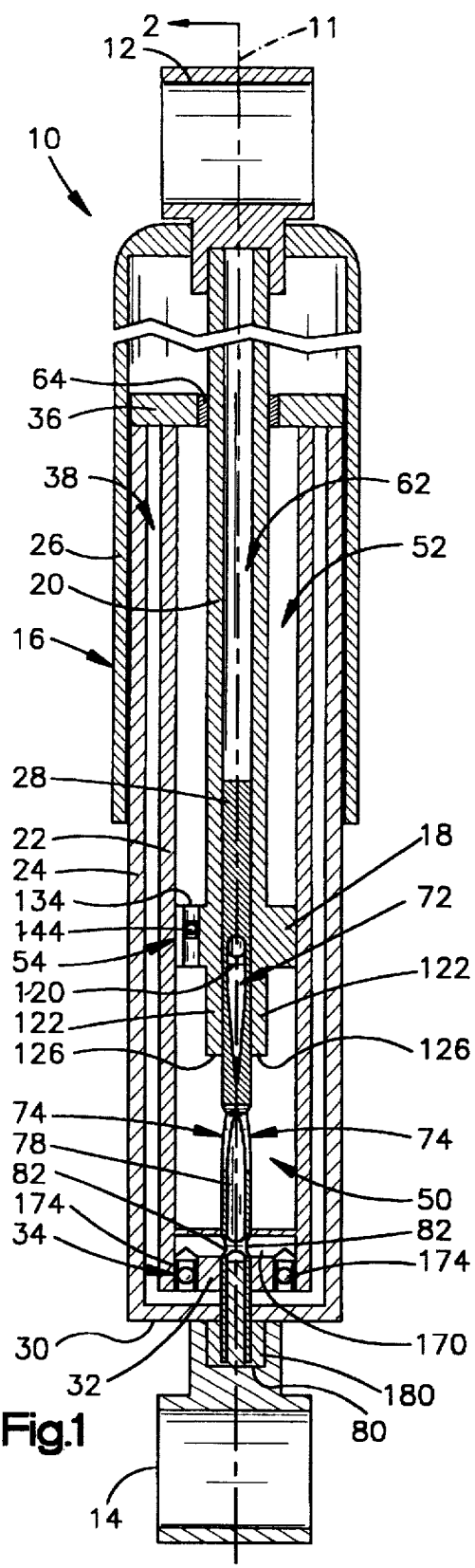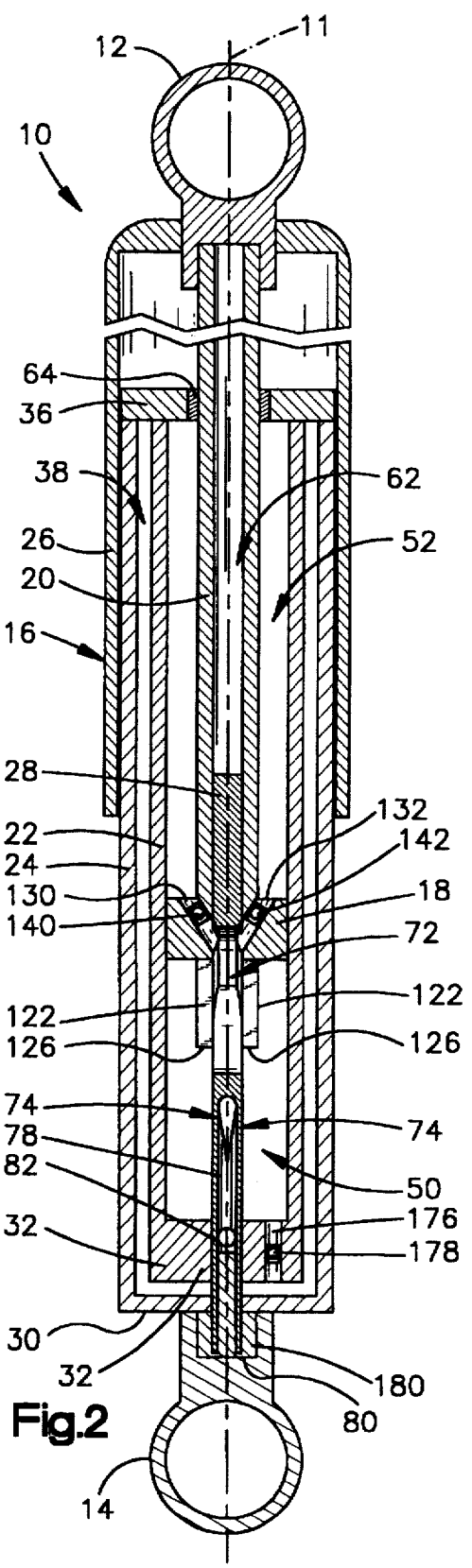

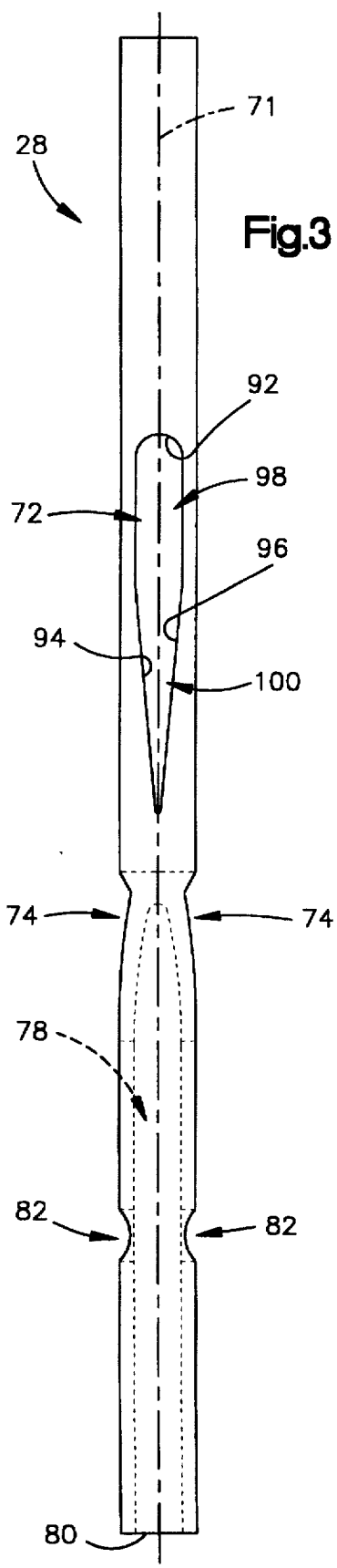
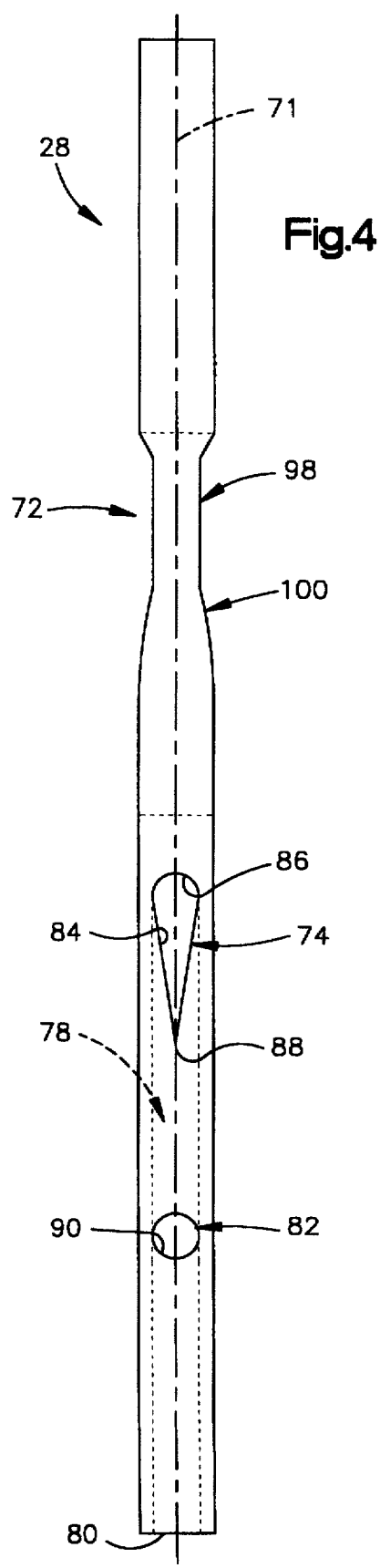

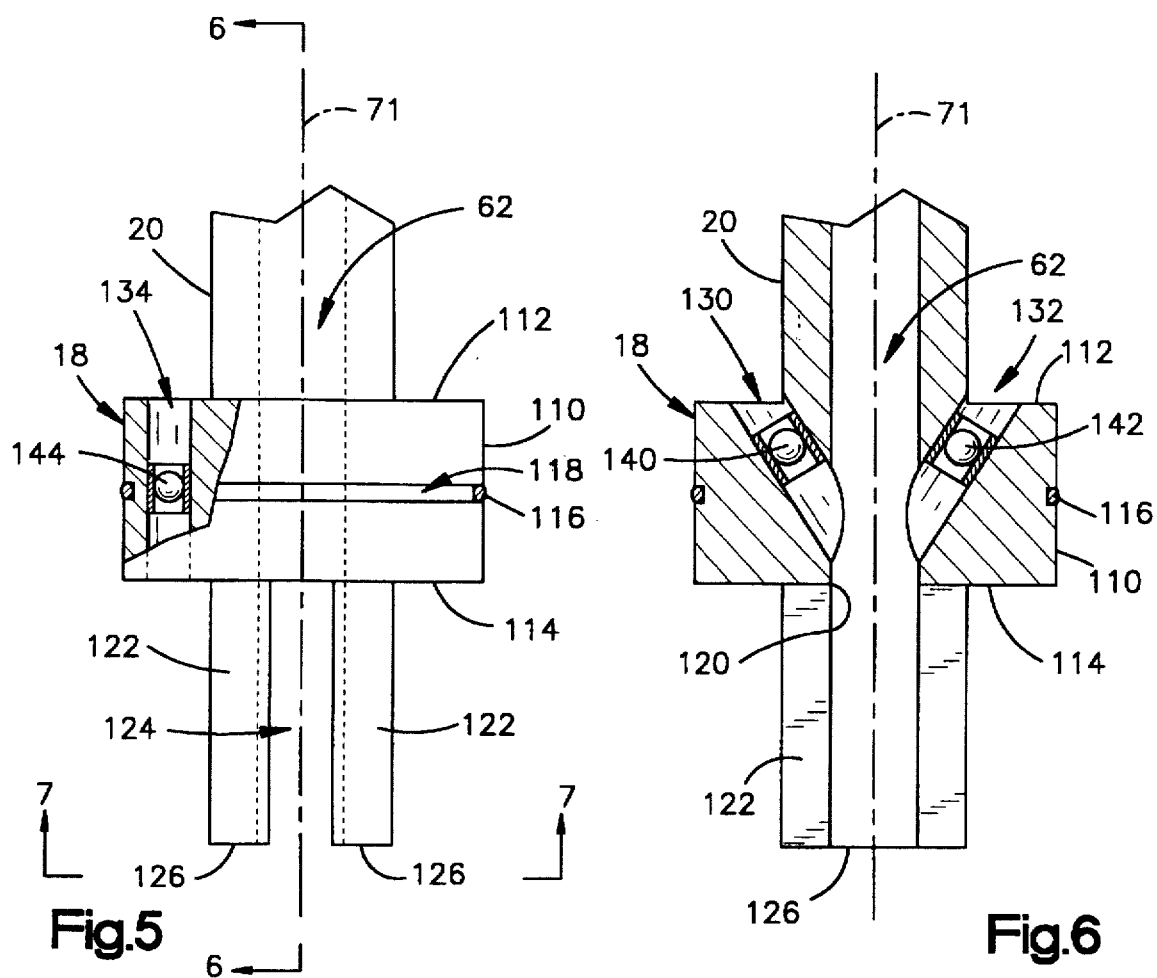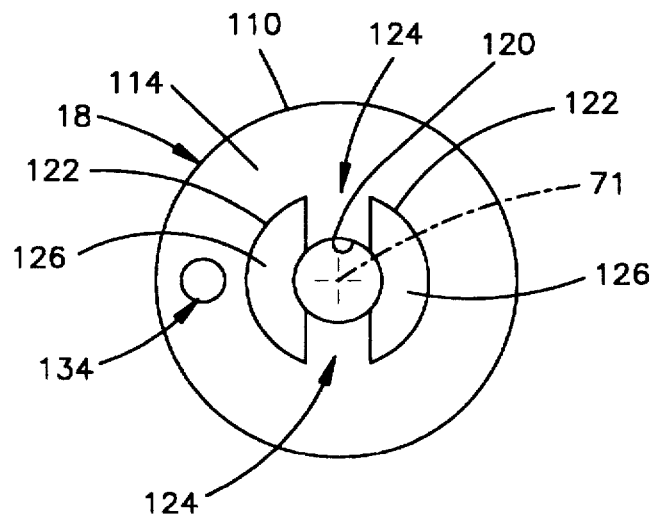

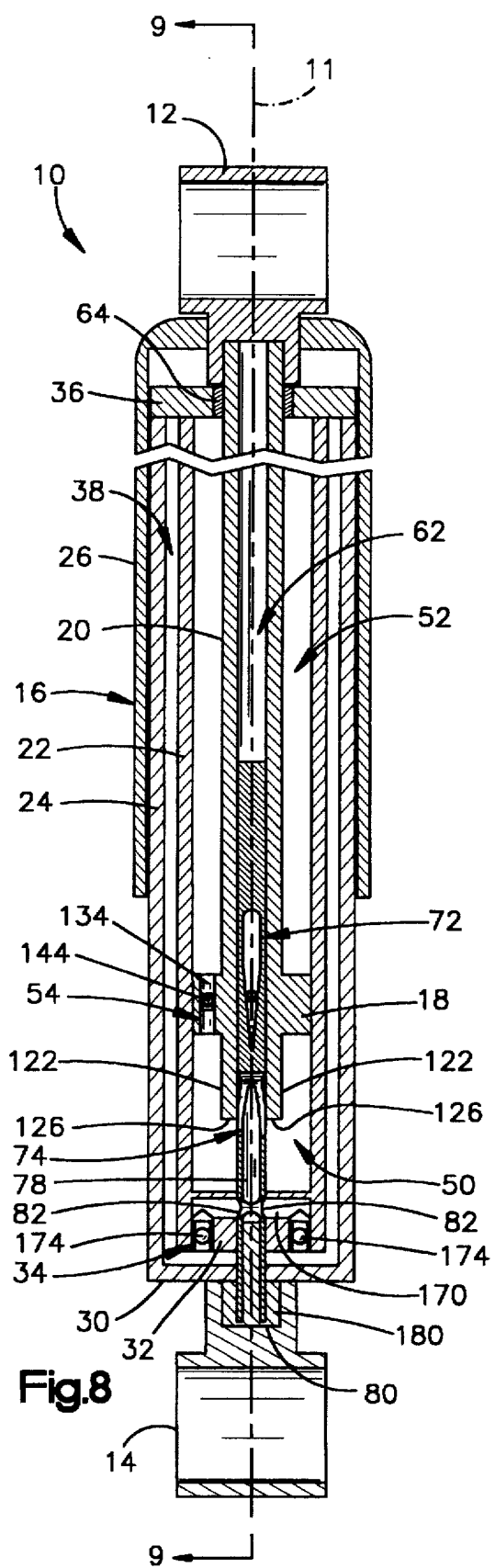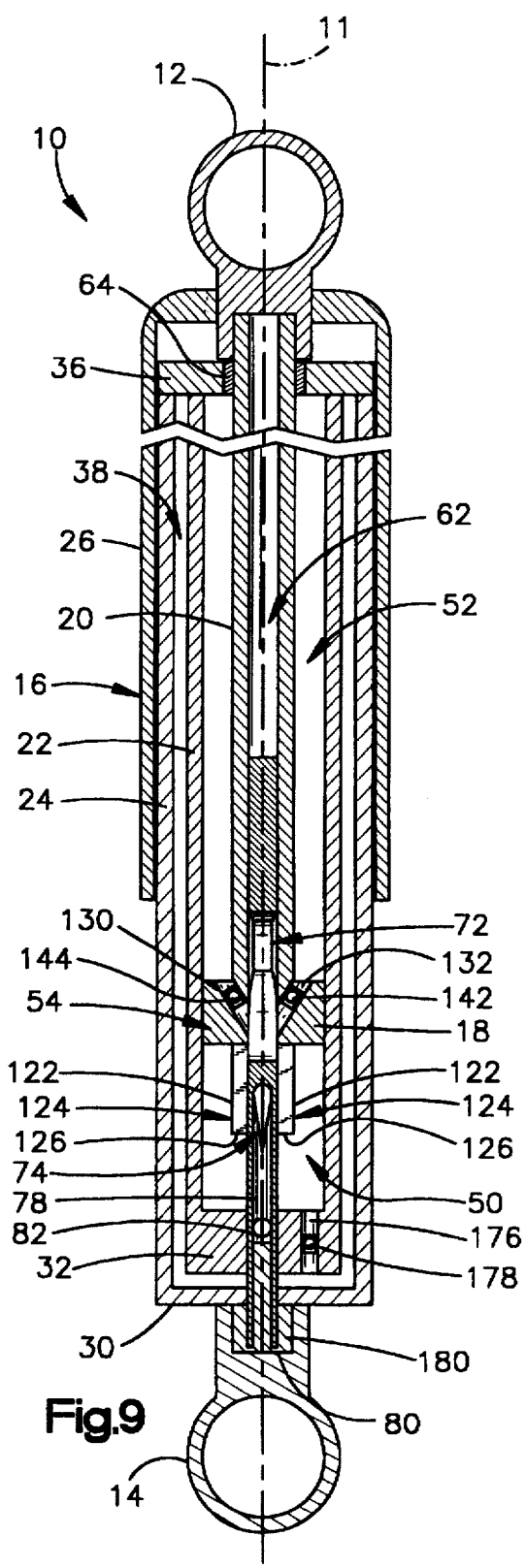

5,779,007

1

SHOCK ABSORBER WITH HYDRAULIC FLUID CONTROL ROD

FIELD OF THE INVENTION

The present invention relates to a shock absorber for a vehicle, and particularly relates to an apparatus for controlling the flow of hydraulic fluid within a shock absorber upon compression and extension of the shock absorber.

BACKGROUND OF THE INVENTION

A vehicle shock absorber, which is sometimes referred to as a damper, has a cylindrical structure with an upper end connected to the vehicle frame and a lower end connected to the vehicle suspension. The shock absorber is forcefully compressed and extended under the influence of vehicle suspension loads, and thus functions to dampen oscillations of a corresponding vehicle suspension spring.

A tubular portion of the shock absorber defines upper and lower hydraulic fluid chambers above and below a piston. The piston is fixed to one end of the shock absorber, and moves vertically toward and away from the other end upon compression and extension of the shock absorber. When the piston moves in this manner, it forces hydraulic fluid to flow between the upper and lower fluid chambers through a piston valve assembly. The hydraulic fluid resists movement of the piston as it is forced to flow through the piston valve assembly. The damping force provided by the shock absorber results from the resistance of the hydraulic fluid. The damping force is thus related to the rate at which the hydraulic fluid flows through the piston valve assembly.

SUMMARY OF THE INVENTION

In accordance with the present invention, an apparatus comprises a shock absorber which is longitudinally compressible and extendable under the influence of vehicle suspension loads. The shock absorber includes a tubular structure which defines upper and lower hydraulic fluid chambers above and below a piston. The shock absorber further includes a control rod supported for movement longitudinally through the piston simultaneously with compression and extension of the shock absorber. The control rod and the piston together define a hydraulic fluid flow path extending through the piston between the upper and lower fluid chambers.

In a preferred embodiment of the present invention, the control rod has surfaces which vary the size of the fluid flow path upon movement of the control rod through the piston. In the preferred embodiment, those surfaces of the control rod constrict the fluid flow path when the shock absorber is being compressed. This enables the shock absorber to provide a damping forces that increases as the compressed length of the shock absorber decreases.

BRIEF DESCRIPTION OF THE DRAWINGS

Further features of the present invention will become apparent to those skilled in the art to which the present invention relates from reading the following description with reference to the accompanying drawings, in which:

FIG. 1 is a partly schematic sectional view of a shock absorber comprising a preferred embodiment of the present invention;

FIG. 2 is a view taken on line 2—2 of FIG. 1;

FIG. 3 is an enlarged view of a part shown in FIGS. 1 and 2;

2

FIG. 4 is a view taken on line 4—4 of FIG. 3;

FIG. 5 is an enlarged view of other parts shown in FIGS. 1 and 2;

FIG. 6 is a view taken on line 6—6 of FIG. 5;

FIG. 7 is a view taken on line 7—7 of FIG. 5;

FIG. 8 is a view similar to FIG. 1 showing the shock absorber in a compressed condition; and FIG. 9 is a view taken on line 9—9 of FIG. 8.

DESCRIPTION OF A PREFERRED EMBODIMENT

An apparatus 10 comprising a preferred embodiment of the present invention is shown in FIG. 1. The apparatus 10 is a double tube shock absorber with a cylindrical shape centered on a longitudinal axis 11. An upper mounting eye 12 at the upper end of the shock absorber 10 is connectable to a vehicle frame in a known manner. A lower mounting eye 14 at the lower end of the shock absorber 10 is likewise connectable to a vehicle suspension. The shock absorber 10 is longitudinally compressible and extendable under the influence of vehicle suspension loads. When the shock absorber 10 compresses and extends, it uses hydraulic fluid to damp oscillations of a corresponding vehicle suspension spring (not shown).

The shock absorber 10 includes a tubular structure 16, a piston 18, and a piston rod 20. The tubular structure 16 includes an inner tube 22, an outer tube 24, and a shield tube 26. In accordance with the present invention, the shock absorber 10 further includes a control rod 28. The control rod 28 functions to control the flow of hydraulic fluid within the shock absorber 10 upon compression and extension of the shock absorber 10.

The outer tube 24 has a lower end wall 30 which is fixed to the lower mounting eye 14. Any suitable fastening structure known in the art, such as a weld, can be used to attach the lower end wall 30 to the lower mounting eye 14, as well as to attach the other interconnected parts of the shock absorber 10 that are described below. (For clarity of illustration, such fastening structures are omitted from the drawings).

The inner tube 22 is located concentrically within the outer tube 24, and has a lower end wall 32 which supports a base valve assembly 34. An upper bushing 36 fixes and seals the inner and outer tubes 22 and 24 to each other at their upper ends. The bushing 36 may have any suitable structure known in the art. In this arrangement, a hydraulic fluid reservoir 38 with a fixed volume is defined by and between the inner and outer tubes 22 and 24. The reservoir 38 is partially filled with hydraulic fluid (not shown).

The inner tube 22 defines a pair of variable volume hydraulic fluid chambers 50 and 52 on opposite sides of the piston 18. Specifically, a lower fluid chamber 50 with a variable volume is located within the inner tube 22 beneath the piston 18. An upper fluid chamber 52 with a variable volume is located within the inner tube 22 above the piston 18. The upper chamber 52 is filled with hydraulic fluid, and communicates with the lower chamber 50 through the control rod 28 and a piston valve assembly 54. The lower chamber 50, which also is filled with hydraulic fluid, communicates with the reservoir 38 through the control rod 28 and the base valve assembly 34.

The control rod 28 is fixed to both the inner and outer tubes 22 and 24, and projects axially upward into a bore 62 extending through the center of the piston 18 and the piston rod 20. The piston rod 20 projects axially outward from the inner tube 22 through a seal 64 at the center of the bushing 36. The upper mounting eye 12 and the shield tube 26 are both fixed to the piston rod 20 at its upper end. Accordingly, when the upper and lower mounting eyes 12 and 14 are moved axially toward and away from each other upon compression and extension of the shock absorber 10, the piston rod 20 slides axially through the seal 64. The shield tube 26 simultaneously moves telescopically over the outer tube 24. The piston 18, which is fixed to the piston rod 20, simultaneously moves axially within the inner tube 22. When the piston 18 moves downward within the inner tube 22, it slides downward along the control rod 28. When the piston 18 moves upward within the inner tube 22, it slides upward along the control rod 28.

As shown separately in FIGS. 3 and 4, the control rod 28 has a longitudinal central axis 71 and a plurality of longitudinally extending slots. The slots include an upper slot 72 and a pair of lower slots 74. The lower slots 74 are diametrically opposed to each other across the axis 71, and are longitudinally coextensive with each other along the axis 71. Each lower slot 74 communicates with an internal passage 78. The internal passage 78 extends downward through the control rod 28 from the lower slots 74 to the lower end 80 of the control rod 28. The internal passage 78 thus communicates the lower slots 74 with a corresponding pair of orifices 82 located directly beneath the lower slots 74.

Importantly, each lower slot 74 is defined by a corresponding edge surface 84 (FIG. 4) of the control rod 28 which has a tapered contour. The tapered contours of the edge surfaces 84 provide the lower slots 74 with teardrop shapes that are tapered fully between wide upper ends 86 and pointed lower ends 88. Each orifice 82 has a circular shape defined by an annular edge surface 90 of the control rod 28.

The upper slot 72 is spaced a short distance upward from the lower slots 74 along the axis 71, and is circumferentially offset from the lower slots 74 90° about the axis 71. The upper slot 72 is also spaced upward from the internal passage 78, and extends fully through the control rod 28. An arcuate inner surface 92 (FIG. 3) of the control rod 28 defines the upper end of the upper slot 72. A pair of opposed inner side surfaces 94 and 96 of the control rod 28 face each other across the inside of the upper slot 72. The inner side surfaces 92 and 94 are parallel to each other along the length of a constant-width portion 98 of the upper slot 72. The inner side surfaces 92 and 94 converge to define a tapered portion 100 of the upper slot 72 beneath the constant-width portion 98.

As shown in the enlarged views of FIGS. 5–7, the piston 18 has a cylindrical outer surface 110, an annular upper side surface 112, and an annular lower side surface 114. A piston ring 116 of known construction extends circumferentially within a groove 118 in the cylindrical outer surface 110. A circular inner edge 120 (FIGS. 6 and 7) of the lower side surface 114 defines the lower end of the bore 62. A pair of piston tabs 122 project longitudinally downward from the lower side surface 114. The piston tabs 122 are opposed to each other diametrically relative to the bore 62, and are circumferentially spaced from each other so as to define a pair of diametrically opposed, slot-shaped gaps 124. Each piston tab 122 has a lower end surface 126.

The piston 18 further has a plurality of hydraulic fluid flow passages. These include first and second passages 130 and 132 (FIG. 6) extending axially upward, and radially outward, through the piston 18 from the bore 62 to the upper side surface 112. A third passage 134 extends vertically through the piston 18 between the upper and lower side surfaces 112 and 114.

The piston valve assembly 54 includes first, second and third check valves 140, 142 and 144 which are respectively contained within the first, second and third passages 130, 132 and 134 in the piston 18. The first and second check valves 140 and 142 permit hydraulic fluid to flow upward through the first and second passages 130 and 132. The third check valve 144 permits hydraulic fluid to flow downward through the third passage 134.

As noted above with reference to FIGS. 1 and 2, the base valve assembly 34 is supported by the lower end wall 32 of the inner tube 22. As shown in FIG. 1, a hydraulic fluid flow passage 170 extends horizontally within the lower end wall 32. The base valve assembly 34 includes a pair of check valves 174 which permit hydraulic fluid to flow downward through the lower end wall 32 from the passage 170 to the reservoir 38. As shown in FIG. 2, another hydraulic fluid flow passage 176 extends vertically through the lower end wall 32 at a location spaced circumferentially from the horizontal passage 170. The vertical passage 176 and a corresponding check valve 178 permit hydraulic fluid to flow upward through the lower end wall 32 from the reservoir 38 to the lower fluid chamber 50.

The control rod 28 extends axially upward from the lower mounting eye 14 through the lower end wall 30 of the outer tube 24, and also through the lower end wall 32 of the inner tube 22. A plug 180 closes the lower end 80 of the control rod 28. The plug 180 is fixed and sealed to the lower mounting eye 14 and the lower end wall 30 of the outer tube 24.

The circular orifices 82 in the control rod 28 are located within the horizontal passage 170 in the lower end wall 32 of the inner tube 22. The lower slots 74 are located within the lower fluid chamber 50. In this arrangement, the lower fluid chamber 50 communicates with the horizontal passage 170 through the lower slots 74, the internal passage 78, and the circular orifices 82 in the control rod 28. The lower fluid chamber 50 thus communicates with the reservoir 38 through the control rod 28 and the check valves 174 in the base valve assembly 34.

The control rod 28 extends further upward between the piston tabs 122 and into the bore 62. The upper slot 72, which extends fully through the control rod 28, is aligned with the gaps 124 that are located between the piston tabs 122. The lower fluid chamber 50 thus communicates with the upper slot 72 through the gaps 124. The upper end 92 of the upper slot 72 is located within the bore 62 adjacent to, or above, the first and second passages 130 and 132 in the piston 18. Accordingly, the lower fluid chamber 50 communicates with the upper fluid chamber 52 along a flow path extending horizontally into the upper slot 72 through the gaps 124 between the piston tabs 122, upward into the bore 62 through the upper slot 72, and further upward through the passages 130 and 132.

The shock absorber 10 normally has a length within a range between a fully extended condition, as shown in FIG. 1, and a fully compressed condition, as shown in FIG. 8. The range of compression and extension can be limited in a known manner, such as by the use of bump stops (not shown). For the purpose of illustration, the operation of the shock absorber 10 is described here with reference to the fully extended and compressed conditions of FIGS. 1 and 8.

When the fully extended shock absorber 10 of FIG. 1 is subjected to an axially compressive vehicle suspension load, the upper and lower mounting eyes 12 and 14 are moved axially toward each other from the positions of FIG. 1 toward the position of FIG. 8. The piston 18 then moves downward within the inner tube 22. This shortens the lower fluid chamber 50 and simultaneously lengthens the upper fluid chamber 52. As a result, hydraulic fluid is forced to flow upward from the lower fluid chamber 50 to the upper fluid chamber 52 along the flow path described above.

The control rod 28 moves relatively upward through the bore 62 simultaneously with downward movement of the piston 18. The upper slot 72 in the control rod 28 then moves upward into the bore 62 past the edge 120 (FIGS. 6 and 7) at the lower end of the bore 62. As the constant-width portion 98 (FIG. 3) of the upper slot 72 moves upward past the edge 120, the flow rate of hydraulic fluid through the upper slot 72 remains constant. However, the flow rate subsequently decreases when the tapered portion 100 of the upper slot 72 moves upward past the edge 120. This is because the flow area provided between the converging side surfaces 92 and 94 decreases as the tapered portion 100 moves upward past the edge 120. As the flow path becomes progressively constricted in this manner, a correspondingly greater vehicle suspension load is required to force a given amount of hydraulic fluid to flow upward from the lower fluid chamber 50 to the upper fluid chamber 52. As a result, the shock absorber 10 provides a correspondingly greater damping force which resists movement of the vehicle frame and the vehicle suspension toward each other along the axis 71.

Compression of the shock absorber 10 also causes hydraulic fluid to flow from the lower fluid chamber 50 to the reservoir 38. As described above, the flow path extending from the lower fluid chamber 50 to the reservoir 38 is defined in part by the lower slots 74 in the control rod 28. As the control rod 28 moves relatively upward into the bore 62, the lower slots 74 move upward toward and between the piston tabs 122. Since the lower slots 74 have tapered shapes that converge toward their lower ends 88, their flow areas decrease as they move upward past the lower end surfaces 126 of the piston tabs 122. Such constriction of the flow path extending from the lower fluid chamber 50 to the reservoir 38 causes an additional increase in the damping force that the shock absorber 10 provides in resistance to compression.

When the shock absorber 10 is subsequently extended from the condition of FIG. 8 toward the condition of FIG. 1, the upper fluid chamber 52 is shortened and the lower fluid chamber 50 is lengthened. Hydraulic fluid then flows from the upper fluid chamber 52 to the lower fluid chamber 50 through the vertical passage 134 and the corresponding check valve 144 in the piston 18. Hydraulic fluid also flows from the reservoir 38 to the lower fluid chamber 50 through the vertical passage 176 and the corresponding check valve 178 in the lower end wall 32 of the inner tube 22.

The foregoing description of the invention is made with reference to a preferred embodiment. Those skilled in the art may perceive improvements, changes and modifications. Such improvements, changes and modifications within the skill of the art are intended to be covered by the appended claims.

Having described the invention, the following is claimed:

1. Apparatus comprising:

a tubular structure defining first and second variable volume hydraulic fluid chambers on opposite sides of a piston, said tubular structure further defining a hydraulic fluid reservoir; and a control rod which is movable longitudinally through said piston;

said control rod and said piston together defining a first hydraulic fluid flow path extending from said first chamber to said second chamber;

said control rod and said tubular structure together defining a second hydraulic fluid flow path extending from said first chamber to said reservoir, said second flow path being entirely separate from said first flow path;

said control rod having surfaces that vary the sizes of said first and second flow paths upon movement of said control rod through said piston;

said surfaces of said control rod defining first and second tapered slots comprising portions of said first and second flow paths, respectively, said first and second tapered slots being spaced longitudinally from each other.

2. Apparatus as defined in claim 1, wherein said control rod has an internal fluid flow passage extending longitudinally from said second tapered slot toward said reservoir.

3. Apparatus as defined in claim 2, wherein said piston has an elongated part projecting longitudinally over said control rod toward said second tapered slot at a location spaced circumferentially from said first tapered slot, said elongated part of said piston being movable longitudinally over said second tapered slot upon movement of said control rod through said piston, whereby said second fluid flow path becomes constricted upon movement of said control rod through said piston.

4. Apparatus as defined in claim 3 wherein said elongated part of said piston is movable initially toward said second tapered slot as said piston moves over said first tapered slot, and is movable subsequently over said second tapered slot as said piston continues to move over said first tapered slot, whereby said second fluid flow path does not become constricted until after said first fluid flow path becomes constricted.

5. Apparatus as defined in claim 4 wherein said second tapered slot in said control rod is one of a pair of second tapered slots communicating with said internal fluid flow passage at diametrically opposed locations on said control rod, said elongated part of said piston being one of a corresponding pair of elongated parts of said piston which are movable longitudinally over said second tapered slots upon movement of said control rod through said piston.

* * * * *